Dec. 25, 1923.                                    1,478,916
                    E. L. ROBINSON
                   DIRECTION INDICATOR
               Filed June 8, 1922      2 Sheets-Sheet 1
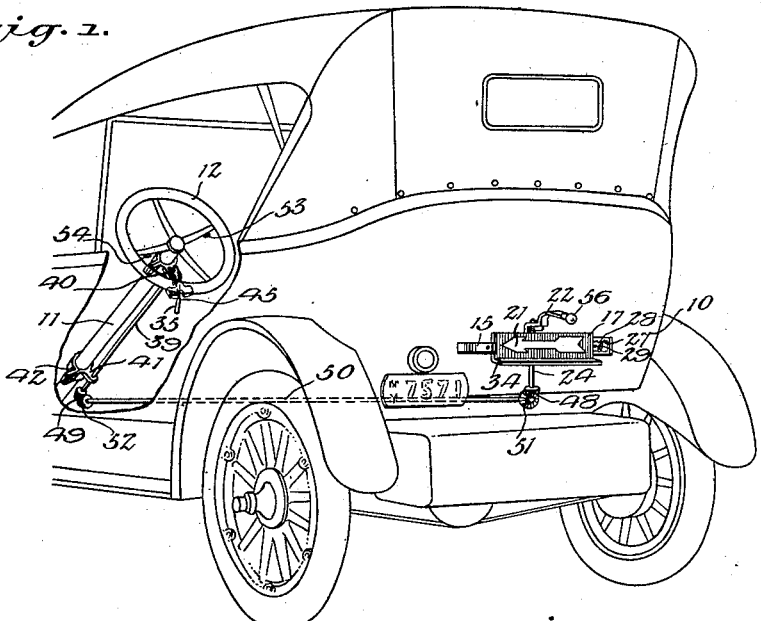
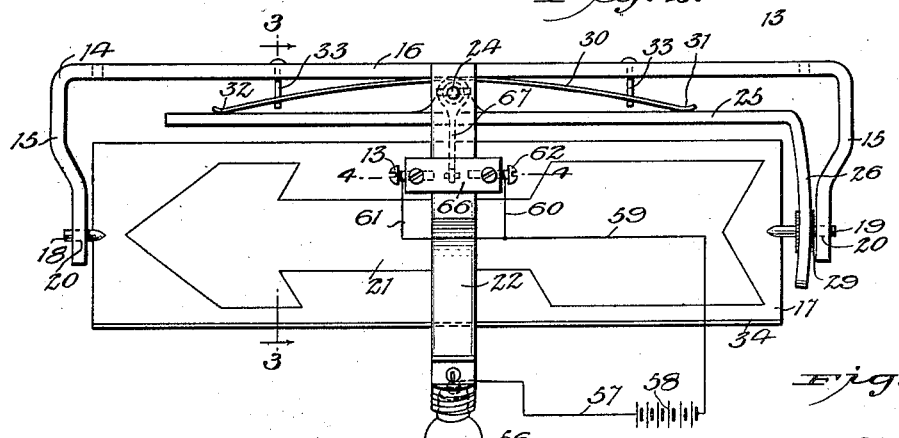
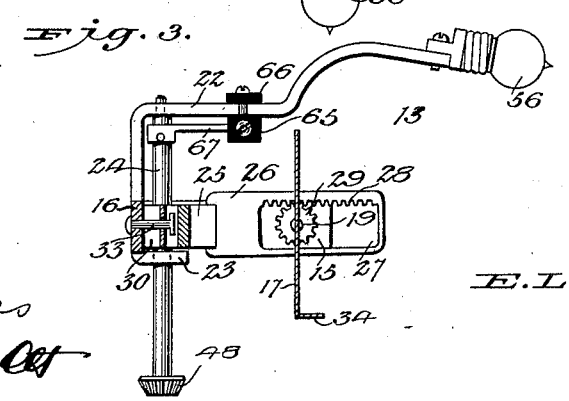
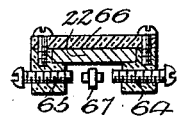
WITNESSES
INVENTOR
E. L. Robinson
BY
ATTORNEYS Dec. 25, 1923. 1,478,916
E. L. ROBINSON
DIRECTION INDICATOR
Filed June 8, 1922 2 Sheets-Sheet 2
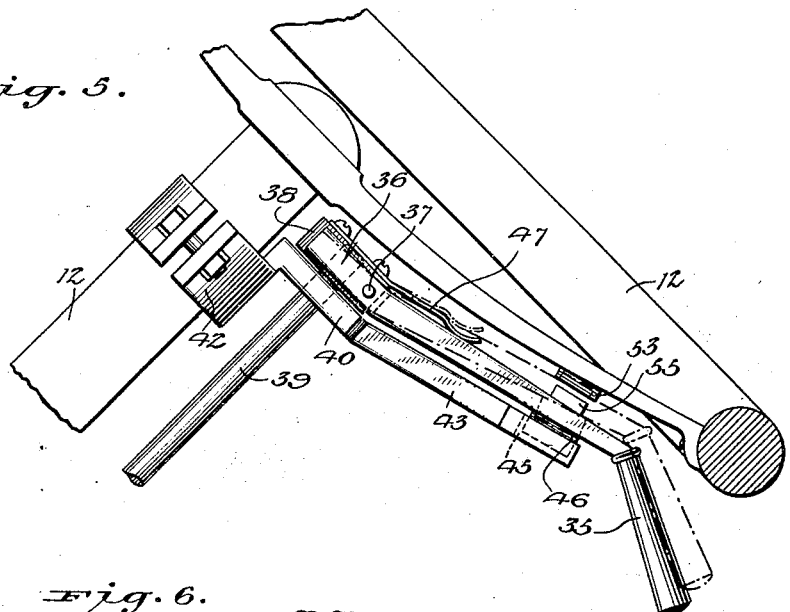
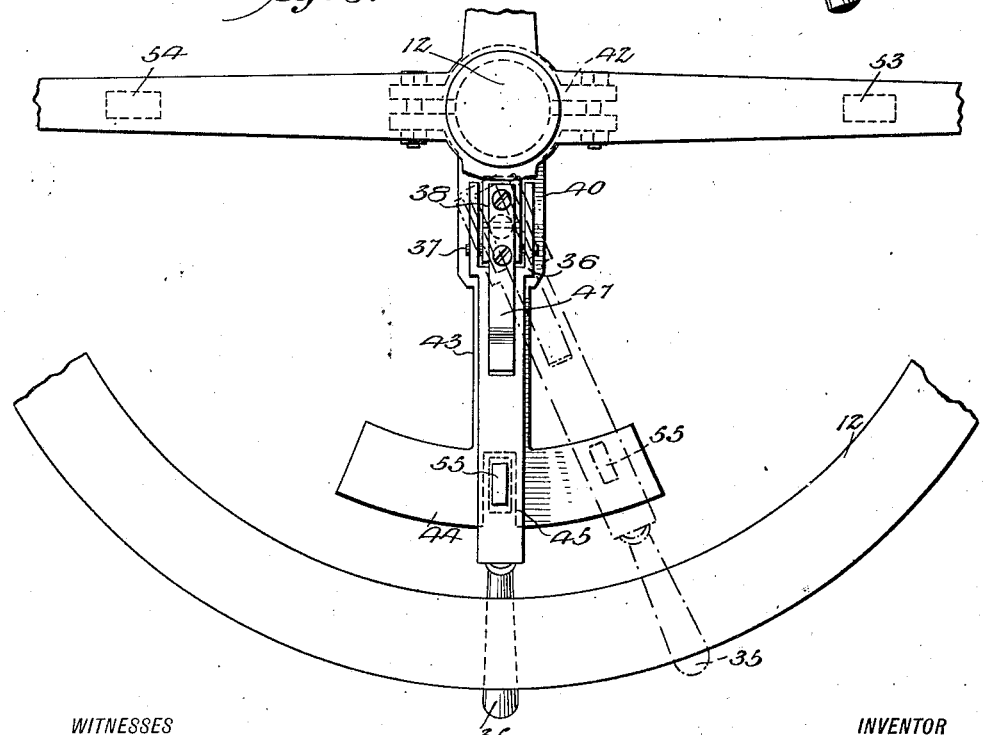
WITNESSES
INVENTOR
E. L. Robinson
BY
ATTORNEYS Patented Dec. 25, 1923.

1,478,916

UNITED STATES PATENT OFFICE.

EZRA L. ROBINSON, OF LOS ANGELES, CALIFORNIA.

DIRECTION INDICATOR.

Application filed June 8, 1922. Serial No. 566,687.

*To all whom it may concern:*

Be it known that I, EZRA L. ROBINSON, a citizen of the United States, and a resident of Los Angeles, in the county of Los Angeles and State of California, have invented a new and Improved Direction Indicator, of which the following is a full, clear, and exact description.

This invention has relation to traffic signaling devices and has particular reference to a direction indicator which is adapted to be installed on a motor vehicle for the purpose of indicating to following traffic the intention of the driver of a preceding vehicle to make a right or left turn.

As an object the invention aims to provide a direction indicator or signaling device which is extremely simple in its construction and mode of operation, which is inexpensive to produce and install and which is thoroughly reliable and highly efficient in its purpose.

As a further object the invention contemplates in a direction indicator or signaling device of the character described a signaling element which is supported from the vehicle in such a manner as to dispose the same in clear view of the traffic and a manipulating means for actuating the signaling element, which means is supported from the steering post directly below the steering wheel and within convenient reach of the operator.

As a further object the invention contemplates means for automatically throwing the manipulating means to normal position and returning the signaling element to neutral position, which means is carried by and operable upon manipulation of the steering wheel in making the turn.

The invention further comtemplates as an object an automatically operable means for illuminating the signaling element upon actuation of the same to signaling or indicating position, whereby the device is rendered operable at night time.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Figure 1 is a fragmentary perspective view of an automobile equipped with the direction indicating or signaling device.

Fig. 2 is an enlarged plan view of the signaling element in neutral position.

Fig. 3 is an enlarged detail sectional view therethrough illustrating a signaling element in signaling position.

Fig. 4 is a detail transverse sectional view taken approximately on the line 4—4 of Fig. 2.

Fig. 5 is a fragmentary side elevation of the upper portion of the steering column and the manipulating means.

Fig. 6 is a fragmentary plan view thereof.

Referring to the drawings by characters of reference, 10 designates a motor vehicle, 11 the steering column and 12 the steering wheel carried by the upper end of the column.

The direction indicating or signaling device which constitutes the invention consists of a signaling element 13 which includes a substantially U-shaped bracket 14, the parallel side arms 15 of which project rearwardly and horizontally from the machine when the connecting portion or bight 16 is attached to the rear of the vehicle. A signaling or indicating blade 17 having trunnions 18 and 19 projecting laterally in opposite directions through apertures 20 in the arms 15 is mounted within the U-shaped bracket 14 for turning movement. The opposite faces of the blade 17 have painted or otherwise inscribed thereon direction indicating arrows 21 which are pointed in reverse directions. The bight or connecting portion 16 of the bracket is provided with upper and lower rearwardly projecting arms 22 and 23, through which a vertical shaft 24 extends and is mounted for turning movement. A transversely disposed lever 25 is attached to the shaft for turning movement therewith and one extremity of said lever is provided with a rearwardly projecting arcuate terminal 26 which is slotted as at 27 to accommodate and receive the trunnion 19 which passes therethrough. The upper end of the slotted portion 27 is provided with rack teeth 28 which interengage with a pinion 29 carried by the trunnion 19. A bowed leaf spring 30 is interposed between the confronting faces of the bight or connecting portion 16 of the bracket and the lever 25, the opposite extremities 31 and 32 thereof bearing against the lever. Stop elements 33 extend through apertures in the leaf spring adjacent its opposite extremities for limiting the action or pressure of the spring terminals against the lever. The spring 30 operates to normally maintain the lever 25 in parallel relation to the bight or connecting portion 16 of the bracket and in this position the rack teeth are so correlated with the pinion as to hold the blade 17 in a horizontal or neutral position whereby the arrows will be invisible to following traffic. In this position the rear edge of the blade is upturned as at 34 in order to obstruct from view the arrow on the uppermost face to the driver of a following vehicle. From the foregoing it will thus be seen that a slight turning movement of the vertical shaft 24 in either direction will effect a swinging of the lever 25, thereby resulting due to the interengagement of the rack teeth 28 with the pinion, in the turning of the blade to a vertical position to bring the arrows clearly in view of following traffic.

The means for actuating the signaling element 13 consists of a manipulating lever 35 which is mounted for transverse swinging movement directly beneath the steering wheel 12. The inner end of the lever 35 is bifurcated or forked as at 36 and said bifurcated or forked portion is pivoted as at 37 for vertical swinging movements from a head 38. The head 38 is rigidly attached to the upper end of a shaft 39 which is journaled in upper and lower bearing arms 40 and 41 attached to the steering column 12 by clamps 42. The upper arm is provided with a rearwardly projecting T-shaped extension 43, the head 44 of which is of arcuate formation and is provided with a central notch or depression 45. The under side of the manipulating lever 35 is provided with a depending lug or detent 46 which is spaced from the connected inner end an appropriate distance to dispose its path of movement coincident with the head 44. A spring 47 secured to the upper end of the head bears upon the upper side of the manipulating lever and constitutes means for effecting the downward swinging of the same to dispose the lug or detent in contact with the upper face of the head and to effect the engagement of the lug or detent in the notch 45, whereby the manipulating lever is held in a neutral position. The shafts 24 and 39 are operatively connected with each other at their lower ends in such a manner that when the manipulating lever is swung to the right, the blade 17 will be turned to a vertical position to dispose the arrow 21 which points to the right to the view of following traffic. As specifically illustrated this means of connection consists in providing the lower extremity of the shaft 24 with a beveled gear 48 and the lower end of the shaft 39 with a beveled gear 49, and providing a shaft 50 having a beveled gear 51 at its rear end meshing with the gear 48 and a beveled gear 52 at its forward end meshing with the gear 49.

The complete operation is as follows: Assuming the manipulating lever 35 to be in a normal position with the lug or detent 46 in the notch 45 and the blades 17 in a horizontal position, and the driver desires to signal an intention to make a right turn; he grasps the handle of the manipulating lever 35 and lifts upwardly thereon against the action of the spring 47 to disengage the lug or detent 46 from the notch 45; he then swings the lever 35 to the right thereby turning the shaft 39 to the right or in an anti-clockwise direction; the beveled gear 49 will be likewise turned in the same direction, thus turning the shaft 50 through the engagement of the beveled gear 52 therewith in the opposite direction. This will turn the shaft 24 to the right through the interengagement of the beveled gears 48 and 51. The turning of the shaft 24 to the right effects the swinging of the arcuate terminal 26 of the lever 25 forwardly thereby turning the blade 17 to a vertical position to dispose the lower face with the arrow pointing toward the right in a position to be visualized by following traffic. The elements will remain in this position until the driver of the vehicle manipulates the steering wheel 12 to make the turn. In order to automatically return the parts to normal or neutral position, the steering wheel has provided on its under side depending lugs 53 and 54 which are carried by diametrically opposed spokes of the steering wheel. When the right turn is made, the lug 53 will coact and engage with an upwardly projecting lug 55 on the lever 35, which lug is disposed in the path of movement of the lug 53 only when the manipulating lever is elevated as illustrated in dotted lines in Fig. 5. The turning of the wheel and the interengagement of the lugs 53 and 55 will swing the lever 35 toward its central or neutral position when the spring 47 will operate to force the same downwardly when the lug or detent 46 registers with the notch 45. This leaves the steering wheel free for rotation without effecting further movement of the manipulating lever 35. To signal an intention to make a left turn, the manipulating lever 35 is swung to the left thereby turning the blade 17 to a vertical position to dispose the upper face carrying the arrow 21 which points to the left to a position to be visualized by following traffic. It is of course understood that when the steering wheel 12 is manipulated to make a left turn the lug 54 engages the lug 55 to return the lever 35 and the connected parts to normal or neutral position.

In order to provide means for automatically illuminating the face of the signaling blade when the same is brought to signaling position, an electric lamp 56 is supported from the arm 22 and one terminal of said lamp is grounded on the arm while the opposite terminal is connected by a wire 57 to one pole of a battery 58. The opposite pole of the battery is connected by a circuit wire 59 to branch wires 60 and 61, which in turn are connected to contact elements 62 and 63. The contact elements are mounted in the insulated blocks 64, which blocks are clamped to the arm 22 by a strip 66. The contact elements 64 and 65 are spaced laterally with respect to each other and are adapted to be engaged respectively by a circuit closing arm which is secured to the shaft 24 and movable therewith. In operation as the shaft 24 is rotated to turn the blade 17 to vertical signaling position, the arms 67 will be turned therewith to engage and coact with one of the contact elements 62 or 63. When so engaged the current flows from the battery through the circuit wire 59, one of the branch wires 60 or 61 to the contact elements 62 or 63, thence through the circuit closing arm 67 through the arm 22 to the grounded terminal of the lamp through the filament to the opposite terminals, thence to the circuit wire 57 and to the opposite pole of the battery 58.

I claim:

1. A direction signal for motor vehicles embodying a signaling plate having directional indicia on the opposite faces thereof, means for mounting said plate on a horizontal axis for turning movements in opposite directions, means for normally maintaining said plate in a horizontal position to mask from view the opposite faces and the directional indicia thereon, manipulating means mounted adjacent the steering mechanism of the vehicle and connected with said plate for turning the same in opposite directions from its normal horizontal position to its vertical positions to display the opposite faces and the directional indicia thereon, and means provided respectively on the steering mechanism and the manipulating means adapted to coact upon operation of the steering mechanism in following the signaled direction for returning the manipulating means and the signal plate to its normal position.

2. A direction signal for motor vehicles embodying a signal plate having directional indicia on the opposite faces thereof, means for mounting said plate on a horizontal axis for turning movements in opposite directions consisting of a substantially horizontal U-shaped frame, trunnions at the opposite ends of the plate journaled in the arms of said frame, a pinion on one of said trunnions, a lever mounted for swinging movement in said frame, said lever having an offset terminal, a rack on the offset terminal engaging the pinion, a leaf spring engaging the lever for normally swinging and holding the lever in a position to maintain the signal plate in a horizontal plane, and manipulating means connected with said lever for rocking the same in opposite directions to turn the plate from its normal horizontal position to its vertical positions for displaying the opposite faces thereof.

3. A direction signal for motor vehicles embodying a signal plate having directional indicia on the opposite faces thereof, means for mounting said plate on a horizontal axis for turning movements in opposite directions consisting of a substantially horizontal U-shaped frame, trunnions at the opposite ends of the plate journaled in the arms of said frame, a pinion on one of said trunnions, a lever mounted for swinging movement in said frame, said lever having an offset terminal, a rack on the offset terminal engaging the pinion, a leaf spring engaging the lever for normally swinging and holding the lever in a position to maintain the signal plate in a horizontal plane, manipulating means connected with said lever for rocking the same in opposite directions to turn the plate from its normal horizontal position to its vertical positions for displaying the opposite faces thereof, said manipulating means comprising a hand lever having operative connection with the first mentioned lever and mounted adjacent the steering mechanism, and interengageable means on the steering mechanism and the hand lever adapted to coact upon operation of the steering mechanism to follow the signaled direction, for returning the hand lever and the signal plate to normal position.

EZRA L. ROBINSON.